United States Patent
Fassino et al.

(10) Patent No.: US 10,503,663 B2
(45) Date of Patent: *Dec. 10, 2019

(54) METHOD AND DEVICE FOR SECURE PROCESSING OF ENCRYPTED DATA

(71) Applicant: STMicroelectronics (Grenoble 2) SAS, Grenoble (FR)

(72) Inventors: Jean-Philippe Fassino, Gresin (FR); Roland Bohrer, Grenoble (FR); Laurent Gerard, La Tronche (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,922

(22) Filed: May 25, 2018

(65) Prior Publication Data

US 2018/0293178 A1 Oct. 11, 2018

Related U.S. Application Data

(63) Continuation of application No. 14/840,132, filed on Aug. 31, 2015, now Pat. No. 9,984,005.

(30) Foreign Application Priority Data

Dec. 19, 2014 (FR) ..................... 14 62880

(51) Int. Cl.
*G06F 12/14* (2006.01)
*G06F 12/00* (2006.01)
(Continued)

(52) U.S. Cl.
CPC .......... *G06F 12/1408* (2013.01); *G06F 21/10* (2013.01); *G06F 21/79* (2013.01);
(Continued)

(58) Field of Classification Search
CPC ...... G06F 12/1408; G06F 21/10; G06F 21/79; G06F 21/84; G06F 21/53; G06F 21/6218;
(Continued)

(56) References Cited

U.S. PATENT DOCUMENTS 7,734,932 B2   6/2010  Buer
8,261,320 B1   9/2012  Serenyi et al.
(Continued)

*Primary Examiner* — Michael Simitoski
(74) *Attorney, Agent, or Firm* — Slater Matsil, LLP

(57) ABSTRACT

A method for secure processing of encrypted data within a receiver includes receiving a packet of encrypted compressed data and allocating a region of memory for storing a decrypted version of the packet of encrypted compressed data. The allocation is in response to, and after, reception of the encrypted compressed data. A size of the region of the memory allocated is equal to a size of the packet of encrypted compressed data that is received. The method further includes modifying a configuration of an access authorization filter for defining access rights to the allocated region, decrypting the packet of encrypted compressed data, and storing, in the allocated region, the decrypted compressed data of the packet. The aforementioned allocation, modification, decryption, and storage steps are repeated in response to each new reception of a packet of encrypted compressed data so as to dynamically modify the configuration of the access authorization filter.

20 Claims, 1 Drawing Sheet

(51) Int. Cl.
*H04L 9/08* (2006.01)
*G06F 21/10* (2013.01)
*G06F 21/79* (2013.01)
*G06F 21/84* (2013.01)
*H04N 21/426* (2011.01)
*G06F 21/00* (2013.01)

(52) U.S. Cl.
CPC ............ *G06F 21/84* (2013.01); *H04L 9/0825* (2013.01); *H04N 21/42623* (2013.01); *G06F 2212/1052* (2013.01); *G06F 2221/2141* (2013.01)

(58) Field of Classification Search
CPC ............. G06F 21/74; G06F 2212/1052; G06F 2212/2141; H04L 9/0825; H04N 21/42623; H04N 21/4627; H04N 21/423; H04N 21/44004; H04N 21/4405
See application file for complete search history.

(56) References Cited

U.S. PATENT DOCUMENTS

| | | | |
|---|---|---|---|
| 8,990,946 B1 | 3/2015 | Yarykin et al. | |
| 9,245,108 B1 | 1/2016 | Khajuria et al. | |
| 9,277,223 B2 | 3/2016 | Ziesler | |
| 9,436,812 B2 | 9/2016 | Chhabra et al. | |
| 9,673,985 B2 | 6/2017 | Mangalampalli et al. | |
| 2002/0065776 A1 | 5/2002 | Calder | |
| 2003/0135742 A1 | 7/2003 | Evans | |
| 2005/0138370 A1 | 6/2005 | Goud et al. | |
| 2005/0276264 A1 | 12/2005 | Cordero et al. | |
| 2008/0189560 A1 | 8/2008 | Case et al. | |
| 2009/0172328 A1 | 7/2009 | Sahita et al. | |
| 2009/0316889 A1 | 12/2009 | MacDonald et al. | |
| 2010/0169461 A1 | 7/2010 | Cameron | |
| 2010/0169667 A1 | 7/2010 | Dewan | |
| 2010/0241816 A1 | 9/2010 | Woods et al. | |
| 2010/0293392 A1 | 11/2010 | Miyamoto | |
| 2012/0159184 A1 | 6/2012 | Johnson et al. | |
| 2012/0159648 A1 | 6/2012 | Park | |
| 2012/0227038 A1 | 9/2012 | Hunt et al. | |
| 2013/0166922 A1 | 6/2013 | Wong et al. | |
| 2013/0254494 A1 | 9/2013 | Oxford | |
| 2013/0305342 A1 | 11/2013 | Kottilingal et al. | |
| 2014/0037090 A1 | 2/2014 | Nicholls | |
| 2014/0037272 A1 | 2/2014 | Ziesler | |
| 2014/0314233 A1 | 10/2014 | Evans et al. | |
| 2014/0337836 A1 | 11/2014 | Ismael | |
| 2015/0220707 A1 | 8/2015 | Kline et al. | |
| 2015/0278119 A1 | 10/2015 | Loh et al. | |
| 2015/0280913 A1* | 10/2015 | Smart | G06F 12/1408 713/193 |
| 2015/0358294 A1 | 12/2015 | Kancharla et al. | |
| 2016/0063258 A1 | 3/2016 | Ackerly | |
| 2016/0070887 A1 | 3/2016 | Wu et al. | |
| 2016/0099951 A1 | 4/2016 | Kashyap et al. | |
| 2016/0127249 A1 | 5/2016 | Itoh et al. | |

\* cited by examiner

METHOD AND DEVICE FOR SECURE PROCESSING OF ENCRYPTED DATA

CROSS-REFERENCE TO RELATED APPLICATIONS

This application is a continuation of U.S. patent application Ser. No. 14/840,132 entitled "Method and Device for Secure Processing of Encrypted Data," filed Aug. 31, 2015, which application claims priority to French Application No. 1462880, filed on Dec. 19, 2014, which applications are hereby incorporated herein by reference.

TECHNICAL FIELD

Embodiments of the invention relate to the processing of encrypted data, and more particularly, the protection of data coming from an encrypted video stream.

BACKGROUND

The use of encrypted data for the protection of information is very widespread, notably in the transfer of data such as, for example, in the field of video-graphics data.

A video stream decoding box, such as television decoder, is an electronic unit performing the recovery of encrypted and/or compressed signals with a view to a display them on a television screen. The electronic unit carries out the required decoding, in other words, at least the decrypting and the decompression of the received data, so that the image may be transmitted to the receiving terminal, for example, a television set.

The external signal entering the electronic unit may come from a satellite antenna, from a telephone line, from an optical fiber, from an Ethernet cable, or even from a digital memory stick.

An electronic decoding unit may also be used for processing of data other than video data.

In an electronic decoding unit, four areas may be defined whose required level of security is different. A first area corresponds to the processing of the data prior to its decryption. In this first non-protected area, no particular security is required given that the data is always encrypted, and that the security of the content of the data is ensured by its encryption.

A second very protected area corresponds to the processing of the data once it has been decrypted, but not yet decompressed. This second area may require a very high degree of security because the data has been decrypted, and hence is readable by anyone, and still compressed, which means that it is very easily and very quickly transferable to an external pirate unit for example.

A third protected area corresponds to the processing of the encrypted data after the decompression of this data. This third area may require less stringent security than the second area because, although the data has been decrypted and hence readable by any external system, the data has been decompressed and hence is very voluminous. The transfer of decompressed data to an external unit is much longer, and often prohibitive when the decompressed data is very large.

In the case where the data is to be re-transmitted to an external system, it is possible to re-encrypt the data. In this fourth non-protected area, no additional security may be required given that the data is encrypted.

To prevent the possible pirating of critical data, the critical data corresponding to the non-decompressed decrypted data, the electronic processing units for the data desirably provide an optimal security in the second processing area.

In the prior art, a system is known comprising two separate physical memory areas and a data processing method using one memory area for the non-protected data, and the other memory area for the critical data coming from the decrypting of this data. Such a system may comprise an access authorization filter configured during the design of the system and being non-modifiable.

Such a method has the drawback of blocking a given entire non-modifiable memory space for the processing of the protected data. The consequence of this is that, when the system receives no protected data or very little protected data, only half of the memory physically available within the system is used. Such a system may require the size of the memories used to be doubled and, as a result, the physical size of the electronic units for processing a large data stream to be increased.

SUMMARY

According to one embodiment and its implementation, a method and an associated electronic device are provided for the secure processing of encrypted data allowing access to the critical data, once it has been decrypted, to be preserved prior to it being decompressed using a dynamic management of the access to the critical data, while at the same time optimizing at all times the memory space used for the protected data, on the one hand, and the memory space used for the non-protected data on the other.

According to one aspect, in one embodiment, a method is provided for secure processing of protected data within a receiver comprising a memory or memory means and a configurable filter for access to this memory. The method may comprise:

receiving the data in packets including at least one compressed encrypted data packet, allocating one region of the memory, modifying the configuration of the access authorization filter to define the access rights to the allocated region, decrypting the encrypted compressed data of the at least one received packet, storing in memory the decrypted compressed data of the at least one packet in the allocated and protected region, and repeating steps b) to e) at each new reception of at least one packet of encrypted compressed data in such a manner as to dynamically modify the configuration of the access authorization filter in the course of each reception of at least one packet of encrypted compressed data.

The method thus enables the memory space, in other words the allocated region, to be used and to be blocked for protected data only starting from the moment when such data is received, the size of this memory space being adjusted to the size of the encrypted compressed data received. It is thus possible to conserve a maximum of free memory space that is usable by an operating system. Notably at the power up of the electronic processing device, the method allows all the memory to be used for the start-up given that no protected data is received at start-up.

The memory space dedicated to the processing of initially encrypted compressed data is continually adjusted as a function of the groups of at least one packet of encrypted compressed data received. The method thus offers a dynamic management of the access to the data in the memory.

The access authorization filter, also referred to as a 'CAF' for "Compartment Aware Filter", comprises the identifiers of the electronic modules authorized to access other electronic modules and notably certain memory spaces. By regularly modifying the parameters of the CAF as a function of the new memory spaces created and allocated for the storing of critical or encrypted data, it may be ensured that the access to the critical data is controlled while at the same time optimizing the memory space available for the initially non-protected data.

Each identifier of a module electronic of the decoding unit, also referred to as CID, allows the method to be aware of the reliability of this module and to know whether it is authorized or otherwise to access protected memory areas.

By creating memory spaces dynamically and by modifying the parameters of the CAF as each new memory space is created, it is possible to create secure memory compartments. The read and/or write access permissions may also be modifier dynamically for each CID. Thus, the access rights to memory spaces and for electronic modules can be controlled.

The method controls the creation/destruction of the memory compartments and the access permissions of the electronic modules by modelling an oriented graph where the nodes represent the memory compartments and the electronic modules, and where the arcs represent the access permissions between two nodes.

The method thus offers the possibility of forming a verifiable graph of all the pathways for access to the data authorized by the CAF. The method thus allows the possibility of escape of data to be detected due to the study of the graph of authorized access pathways. The graph is verifiable in that the protection of the data can be guaranteed through accesses to the memory.

Preferably, the access authorization filter comprises the definition of a group of at least one electronic system. Each modification of the configuration of the access authorization filter may be carried out in such a manner as to prohibit any read access, for an electronic system not included within the group, to a memory storage region comprising protected data.

The electronic system or systems of the group comprises electronic systems considered as reliable, in other words, for which access to a memory storage region comprising protected data will be authorized. In contrast, the electronic system or systems not included in the group are not considered as reliable and no access to a memory storage region comprising protected data will be authorized.

The electronic systems considered as reliable, and hence able to belong to the group, may be, for example, an electronic system for decrypting the protected data, a video decoder, and/or an internal processor dedicated to the protected data distinct from the processor on which the main operating system is running.

The electronic systems considered as unreliable may be, for example, the main processor on which the main operating system is running, an electronic system coupled via an input of the USB type, or an audio decoder.

It goes without saying that these examples are non-limiting and depend on the applications envisaged.

The parameters of the CAF are modified at each modification of organization of the memory, so as to control the access to the critical data, in other words, the access to the decrypted compressed data. The access to a memory region comprising critical data thus remains prohibited to any unauthorized system.

The method preferably comprises at least one processing of the decrypted compressed data of the at least one received packet by an electronic processing means, or processor, and storing in memory the processed data in the allocated region. Each modification of the configuration of the access authorization filter may be carried out in such a manner as to prohibit any read and/or write access, for an electronic system not included within the group, to any electronic processor receiving decrypted compressed data.

The parameters of the CAF comprise not only the identifiers of the electronic processor having the right to access a given space, but also the identifiers of the electronic processor having the right to communicate with other processors. In this way, it may be ensured that an external system, not authorized to process critical data, is not able to access the critical data via the access to an electronic processor benefiting from an authorizing access to the memory space comprising critical data.

An electronic processing system or processor transmits a request for accessing a memory space to a control means or controller. The controller receives with the request the identifier of the requestor. It compares it with the identifiers defined in the CAF as authorized to access the memory space prior to accessing or otherwise the request.

According to another aspect, in one embodiment, an electronic device is provided for secure processing of encrypted data comprising a memory, a configurable authorization filter for accessing the memory, means or a receiver circuit for receiving data by packets designed to receive at least one packet of encrypted compressed data, means or a decrypting circuit for decrypting the encrypted compressed data of the at least one received packet, and allocation means or an allocation circuit to allocate a region of the memory to the at least one received packet. The device may further includes control means or a controller to control the decryption of the decrypted compressed data in the allocated region of the memory, adjustment means or an adjustment circuit to modify the parameters of the access authorization filter for defining the access rights to the allocated region so as to modify dynamically the configuration of the access authorization filter in the course of the reception of at least one packet of encrypted compressed data.

Preferably, the adjustment circuit is configured for defining a group of at least one electronic system, and modifying the parameters of the access authorization filter in such a manner as to prohibit any read access, for an electronic system not included within the group, to a memory storage region comprising decrypted compressed data.

The device comprises preferably at least one electronic means or processor for processing the decrypted compressed data of the at least one packet. The controller may be configured for controlling the storing in memory of the processed data delivered at the output of each processor for processing decrypted compressed data. The adjustment circuit may be configured for modifying the parameters of the access authorization filter in such a manner as to prohibit any read and/or write access, for an electronic system not included within the group, to any processor receiving decrypted compressed data.

BRIEF DESCRIPTION OF THE DRAWINGS

Other advantages and features of the invention will become apparent upon examining the detailed description of one non-limiting embodiment and the appended drawings, in which.

DETAILED DESCRIPTION OF ILLUSTRATIVE EMBODIMENTS

Figure 1:
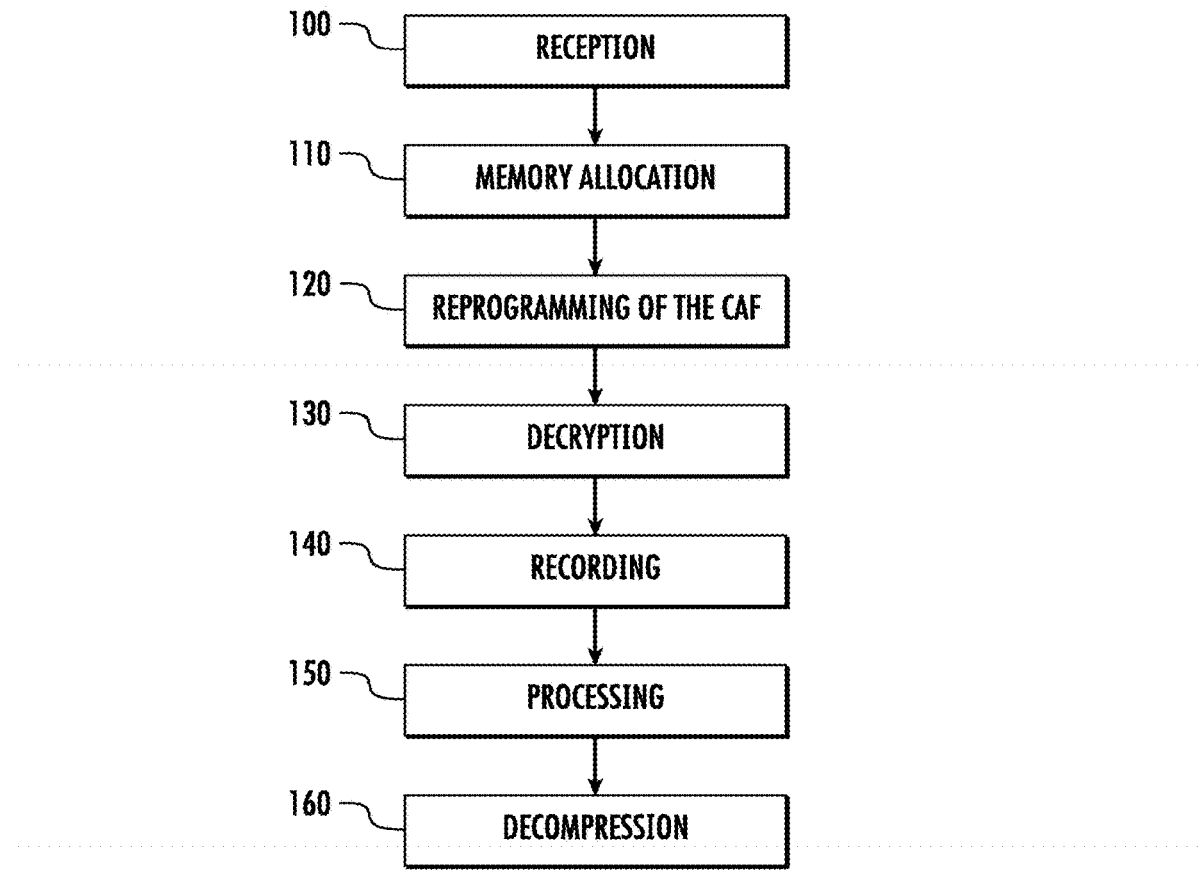
FIG. 1 shows schematically a flow diagram of a method for secure processing of encrypted data within a receiver according to one embodiment of the invention.

FIG. 1 shows schematically a flow diagram of a method for secure processing of encrypted data within a receiver according to one embodiment of the invention.

The method is implemented in a global data processing system receiving a plurality of data packets, the packets containing encrypted compressed data or else unencrypted compressed data.

In a first step 100 of the method, a group of packets of encrypted compressed data is received.

In a step 110, a memory storage region is created in a memory of the system implementing the processing method. The memory storage region has a size allowing the decrypted compressed data of the packets of data of the group of received packets to be stored.

In a step 120, a group of electronic systems considered as reliable is defined and the parameters of the part of the access authorization filter (CAF) of the system relating to the memory storage region created is modified. The parameters of the CAF are modified in such a manner as to define authorizations for access to the memory storage region created in step 120.

In a following step 130, the encrypted compressed data of each packet received is decrypted by a reliable electronic system.

In a step 140, the decrypted compressed data of the packets of the received group is recorded in the memory storage region defined in step 120.

The parameters of the parts of the CAF relating to the electronic means or circuitry in direct or indirect communication with the decrypted decompressed data stored in the memory storage region are also modified. Indirect communication is understood to mean an exchange of information with electronic means or circuitry of communication having processed decrypted decompressed data or having the right to access an electronic means in communication with an electronic means in direct or indirect communication with decrypted decompressed data.

The CAF comprises the identifiers of the electronic modules authorized to access other electronic modules and notably certain memory spaces. When the parameters of a part of the CAF are modified, the parameters of the graph modelling the memory storage regions are modified, and the identifiers of the electronic means authorized to access the memory storage region on the one hand, together with the identifiers authorized to access the electronic means in direct or indirect communication with the data recorded in this memory storage region, are reported.

In a following step 150, one or more processing operation(s) on the decrypted compressed data are carried out while again recording the decrypted compressed data in the same memory storage region after each processing operation.

In a following step 160, a decompression of the decrypted compressed data is carried out. The decompression allows the video data to be displayed in the case of a video data stream. Once decompressed, the decompressed decrypted data occupies a much larger storage space and is then no longer stored in the memory storage region created in the step 120. It is stored in another memory unsecured storage region and the memory storage region created in step 120 is once again free to be used for the processing of other encrypted or non-encrypted compressed data.

Figure 2:
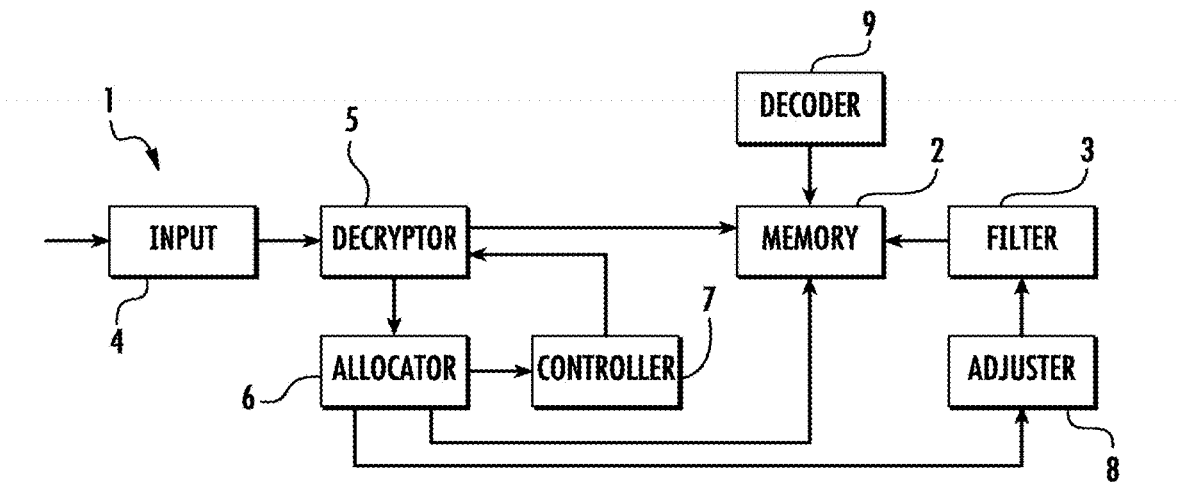
FIG. 2 shows schematically a processing device capable of implementing the method in FIG. 1.

FIG. 2 shows an electronic device capable of implementing the method in FIG. 1.

The electronic device 1 for processing encrypted data comprises memory means 2 and a filter 3 for authorizing access to these memory means 2.

The device 1 comprises at the input means 4 for receiving packets of encrypted compressed data coupled at the output to means 5 of decrypting received encrypted compressed data.

The decryption means 5 are coupled to allocation means 6 determining the size of the packets to be recorded in the same memory storage region and are capable of defining, in operation, a memory storage region based on the memory available for recording the packets of compressed data decrypted by the decryption means 5. The allocation means 6 are coupled to the memory means 2 for defining and assigning the memory storage region.

The device 1 furthermore comprises control means 7 designed to control the recording of the decrypted compressed data in the allocated region of the memory 2. The control means 7 are coupled to the allocation means 6 in order to be informed of the memory storage region allocated, to the decryption means 5 and for controlling the recording of the decrypted compressed data to the memory means 2.

The device 1 also comprises adjustment means 8 designed to configure the filter 3 for authorizing access to the data for defining the access rights to at least a part of the memory means 2 after the reception of the data. The adjustment means 8 are designed to reset at least a part of the filter 3 for authorizing access with new parameters at each new reception of at least one data packet.

The adjustment means 8 receive at the input the information relating to the memory spaces created by the allocation means 6.

The device 1 furthermore comprises a means 9 for processing the encrypted data such as a video stream decoder, or an audio stream decoder.

Each modification of the parameters of the access authorization filter 3 is carried out by the adjustment means 8 in such a manner as to, on the one hand, prohibit, to an unreliable electronic system, any read access to a memory storage region of the memory means 2 comprising decrypted compressed data, and on the other hand, to prohibit, to a computer operating system, any read and/or write access to any electronic processing means 9 receiving decrypted compressed data.

The method for secure processing of encrypted data allows the access to the critical data once decrypted to be preserved before it is decompressed by virtue of a dynamic management of the access to the critical data, while at the same time optimizing at all times the memory space used for the critical data and for the initially non-encrypted data.

The various means of the device 1 for processing encrypted data may be formed by software means within a microprocessor and/or by specific logic circuits.

The method and the device presented in FIGS. 1 and 2 are applied to the protection of data that is encrypted then decoded. The invention is not limited to these exemplary embodiments. The invention allows any data recorded in memory and judged to be sensitive to be protected such as, for example, an application or service executable code which must not be altered, or again an isolation of personal data with respect to type "open source" applications.

What is claimed is:

1. A method, comprising:
   receiving a data packet comprising encrypted compressed data;

allocating a region of a memory for storing a decrypted version of the encrypted compressed data, wherein allocating the region of the memory is performed in response to, and after, reception of the data packet;
first defining access rights to the region of the memory by modifying a parameter of a configurable access authorization filter coupled to the memory;
decrypting the encrypted compressed data of the data packet to form the decrypted version of the encrypted compressed data;
storing the decrypted version of the encrypted compressed data in the region of the memory; and
repeating the allocating, the first defining, the decrypting, and the storing at least once in response to each new reception of subsequent data packets comprising further encrypted compressed data so as to dynamically modify the parameter of the configurable access authorization filter with each new reception of the subsequent data packets.

2. The method of claim 1, wherein the decrypted version of the encrypted compressed data comprises decrypted and compressed data.

3. The method of claim 1, wherein a size of the region of the memory allocated for storing the decrypted version of the encrypted compressed data is equal to a size of the encrypted compressed data that is received.

4. The method of claim 1, wherein first defining access rights to the region of the memory by modifying the parameter of the configurable access authorization filter comprises modifying at least one parameter of a graph modelling memory storage regions of the memory.

5. The method of claim 1, further comprising disabling an allocation of any region of the memory to store the decrypted version of the encrypted compressed data at a power-up of an electronic device comprising the memory.

6. A method comprising:
receiving a data packet comprising encrypted compressed data;
allocating a region of a memory for storing a decrypted version of the encrypted compressed data, wherein allocating the region of the memory is performed in response to, and after, reception of the data packet;
first defining access rights to the region of the memory by modifying a parameter of a configurable access authorization filter coupled to the memory;
decrypting the encrypted compressed data of the data packet to form the decrypted version of the encrypted compressed data;
storing the decrypted version of the encrypted compressed data in the region of the memory; and
repeating the allocating, the first defining, the decrypting, and the storing at least once in response to each new reception of subsequent data packets comprising further encrypted compressed data so as to dynamically modify the parameter of the configurable access authorization filter with each new reception of the subsequent data packets, wherein first defining access rights to the region of the memory by modifying the parameter of the configurable access authorization filter comprises identifying one or more first electronic circuits authorized to access the region of the memory storing the decrypted version of the encrypted compressed data.

7. The method of claim 6, further comprising second defining access rights of one or more second electronic circuits in communication with the one or more first electronic circuits authorized to access the region of the memory storing the decrypted version of the encrypted compressed data.

8. The method of claim 7, further comprising repeating the second defining with the allocating, the first defining, the decrypting, and the storing at least once in response to each new reception of the subsequent data packets.

9. The method of claim 7, wherein second defining access rights of one or more second electronic circuits in communication with the one or more first electronic circuits comprises identifying the one or more second electronic circuits authorized to communicate with the one or more first electronic circuits.

10. The method of claim 7, wherein identifying the one or more first electronic circuits authorized to access the region of the memory storing the decrypted version of the encrypted compressed data comprises identifying the one or more first electronic circuits authorized to read from or write to the region of the memory storing the decrypted version of the encrypted compressed data.

11. A device, comprising:
an input terminal configured to receive a data packet comprising encrypted compressed data;
a decryption circuit configured to decrypt the encrypted compressed data of the data packet to form a decrypted version of the encrypted compressed data;
a memory comprising a region for storing the decrypted version of the encrypted compressed data;
and
a processor coupled to the memory and configured to:
allocate the region of a memory for storing the decrypted version of the encrypted compressed data, wherein allocating the region of the memory is performed in response to, and after, reception of the data packet at the input terminal;
first define access rights to the region of the memory by modifying a configurable access authorization filter parameter;
store the decrypted version of the encrypted compressed data in the region of the memory; and
repeat the allocating, the first defining, the decrypting, and the storing at least once in response to each new reception of subsequent data packets comprising further encrypted compressed data so as to dynamically modify the configurable access authorization filter parameter with each new reception of the subsequent data packets.

12. The device of claim 11, wherein the decrypted version of the encrypted compressed data comprises decrypted and compressed data.

13. The device of claim 11, wherein a size of the region of the memory allocated for storing the decrypted version of the encrypted compressed data is equal to a size of the encrypted compressed data that is received.

14. The device of claim 11, wherein the processor is further configured to disable an allocation of any region of the memory to store the decrypted version of the encrypted compressed data at a power-up of the device.

15. The device of claim 11, wherein the processor is configured to first define access rights to the region of the memory by modifying the configurable access authorization filter parameter by modifying at least one parameter of a graph modelling memory storage regions of the memory.

16. The device of claim 11, wherein the processor is configured to first define access rights to the region of the memory by modifying the configurable access authorization filter parameter by identifying one or more first electronic circuits authorized to access the region of the memory storing the decrypted version of the encrypted compressed data.

17. The device of claim 16, wherein the processor is further configured to second define access rights of one or more second electronic circuits in communication with the one or more first electronic circuits authorized to access the region of the memory storing the decrypted version of the encrypted compressed data.

18. The device of claim 17, wherein the processor is further configured to repeat the second defining with the allocating, the first defining, the decrypting, and the storing at least once in response to each new reception of the subsequent data packets.

19. The device of claim 17, wherein the processor is configured to second define access rights of one or more second electronic circuits in communication with the one or more first electronic circuits by identifying the one or more second electronic circuits authorized to communicate with the one or more first electronic circuits.

20. The device of claim 17, wherein identifying the one or more first electronic circuits authorized to access the region of the memory storing the decrypted version of the encrypted compressed data comprises identifying the one or more first electronic circuits authorized to read from or write to the region of the memory storing the decrypted version of the encrypted compressed data.

\* \* \* \* \*